Sept. 10, 1935. E. C. SLOAN 2,013,865
FIBROUS BODIED ARTICLES AND METHOD OF PRODUCING THE SAME
Filed May 19, 1934 5 Sheets-Sheet 1
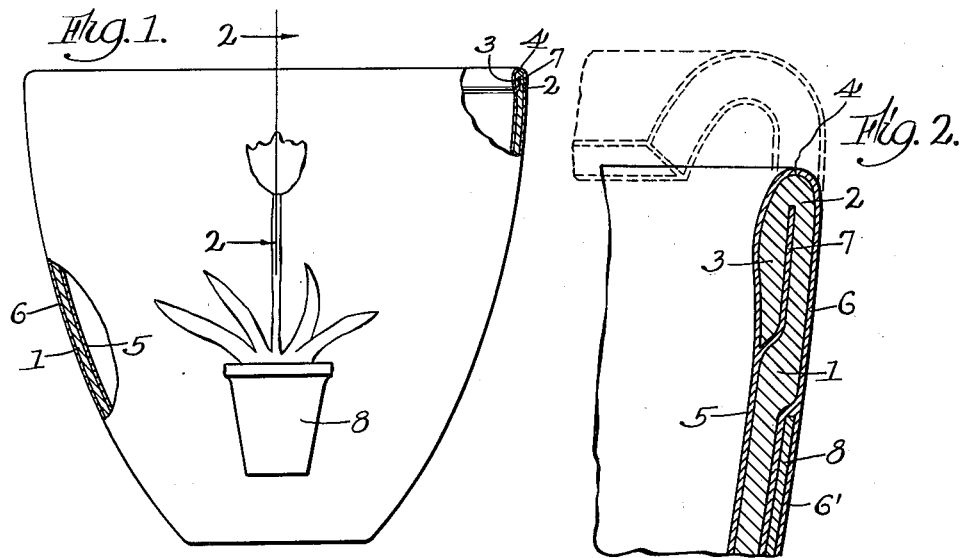
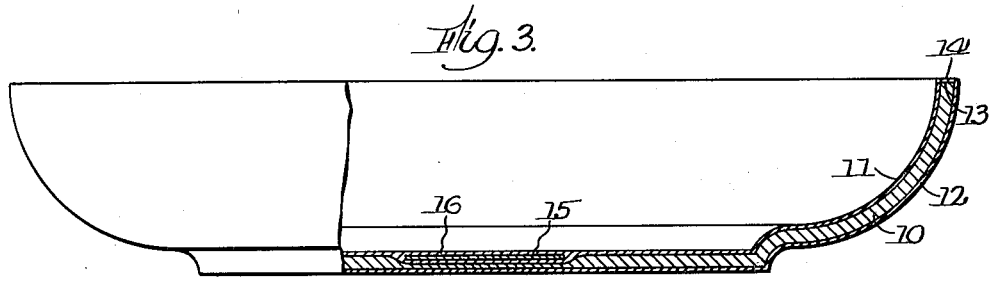
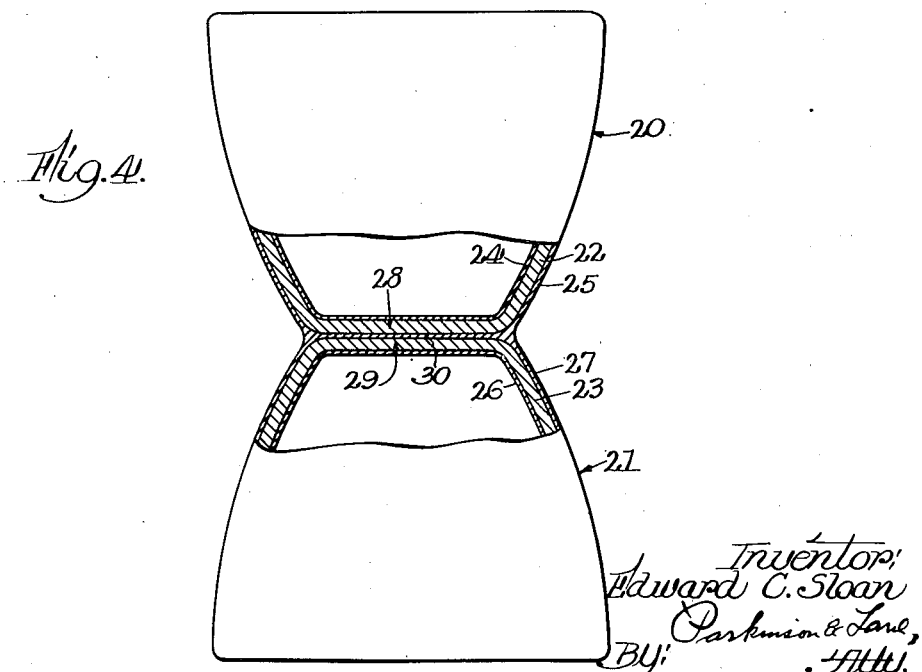
Inventor:
Edward C. Sloan
Parkinson & Lane,
BY: Atty.

Sept. 10, 1935. E. C. SLOAN 2,013,865
FIBROUS BODIED ARTICLES AND METHOD OF PRODUCING THE SAME
Filed May 19, 1934 5 Sheets-Sheet 2
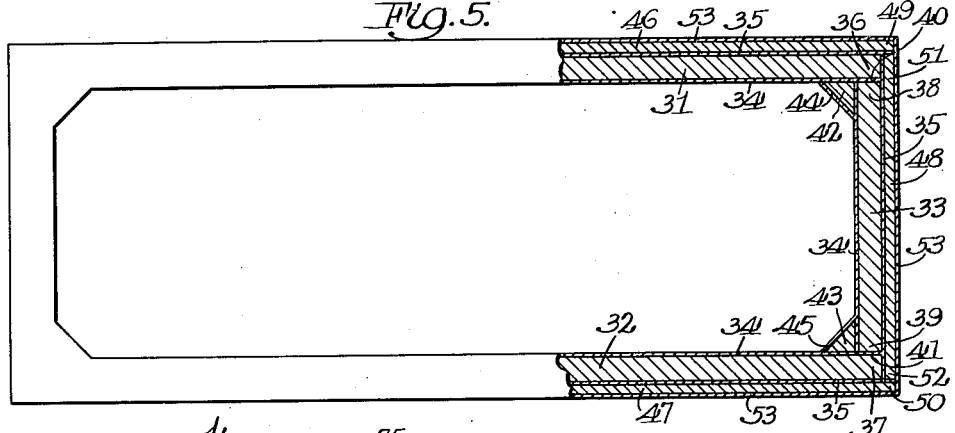
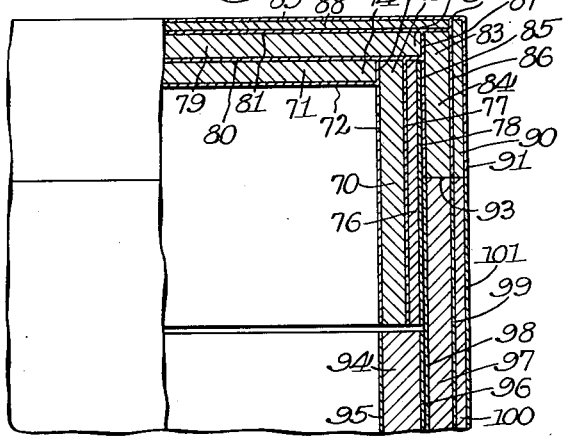
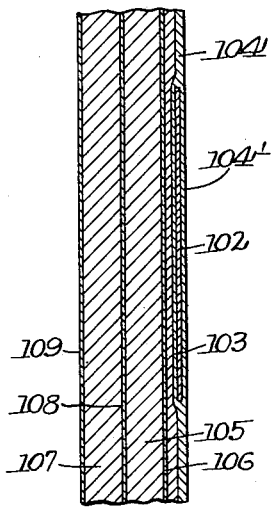
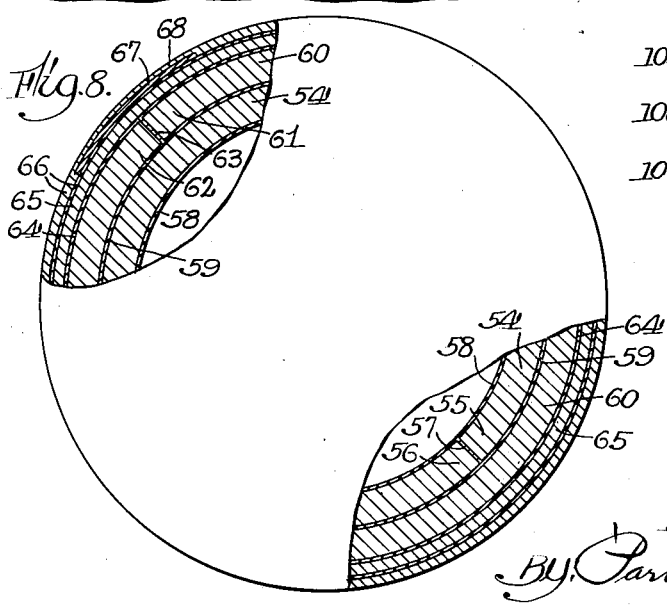
Inventor;
Edward C. Sloan
By Parkinson & Lane,
Atty.

Sept. 10, 1935. E. C. SLOAN 2,013,865
FIBROUS BODIED ARTICLES AND METHOD OF PRODUCING THE SAME
Filed May 19, 1934 5 Sheets-Sheet 3
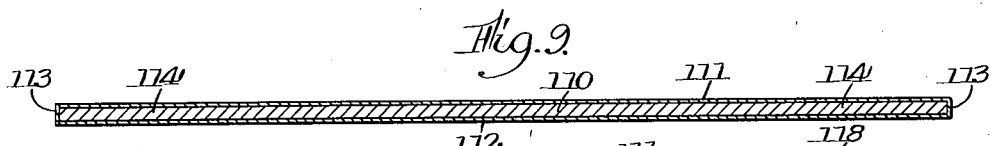
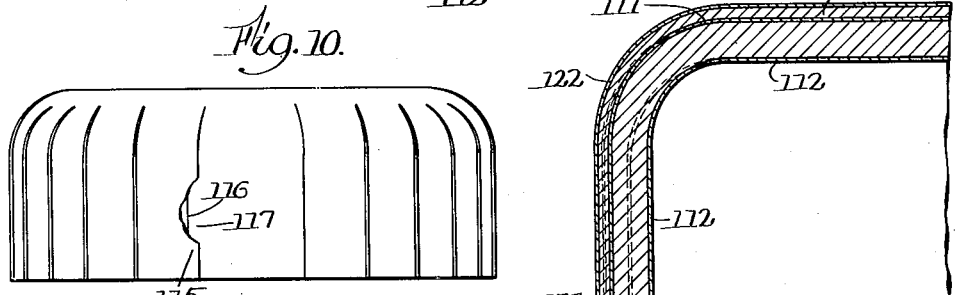
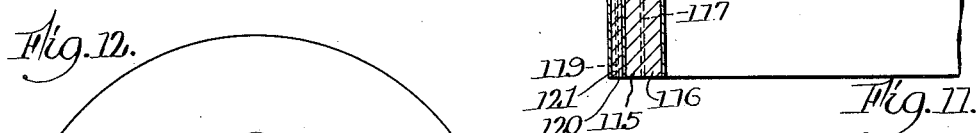
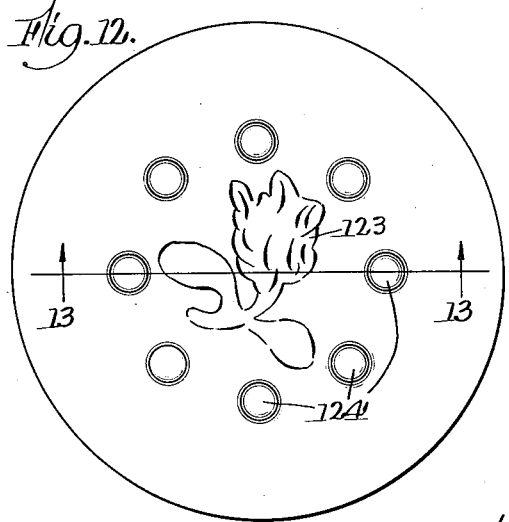
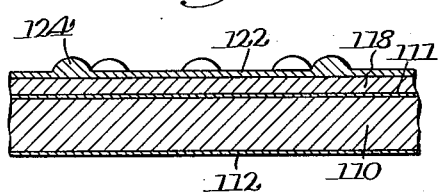
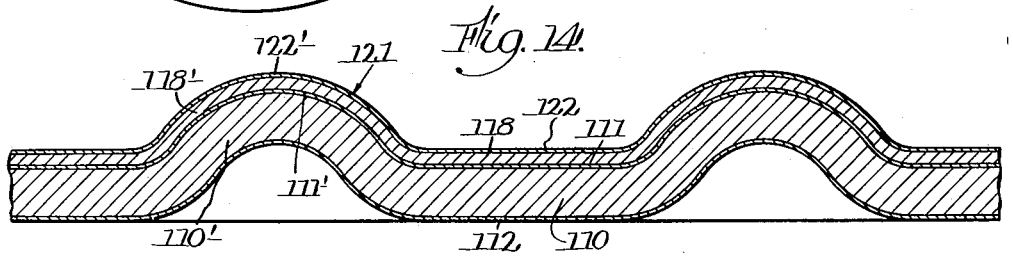
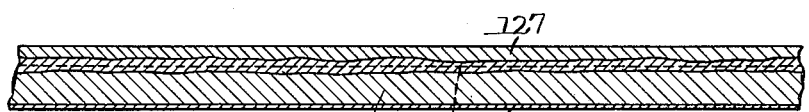
Inventor:
Edward C. Sloan
By Parkinson & Lane
Atty.

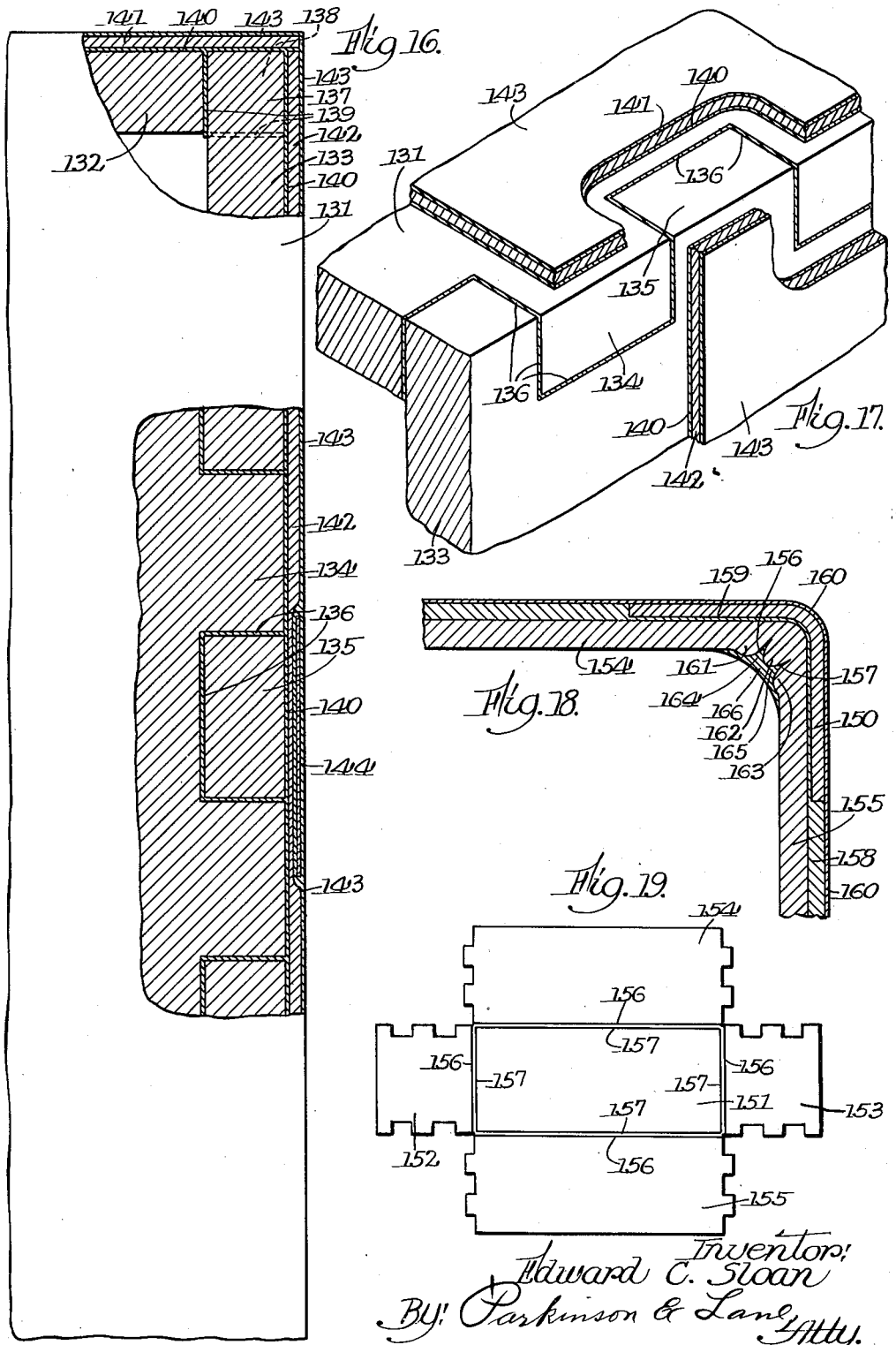

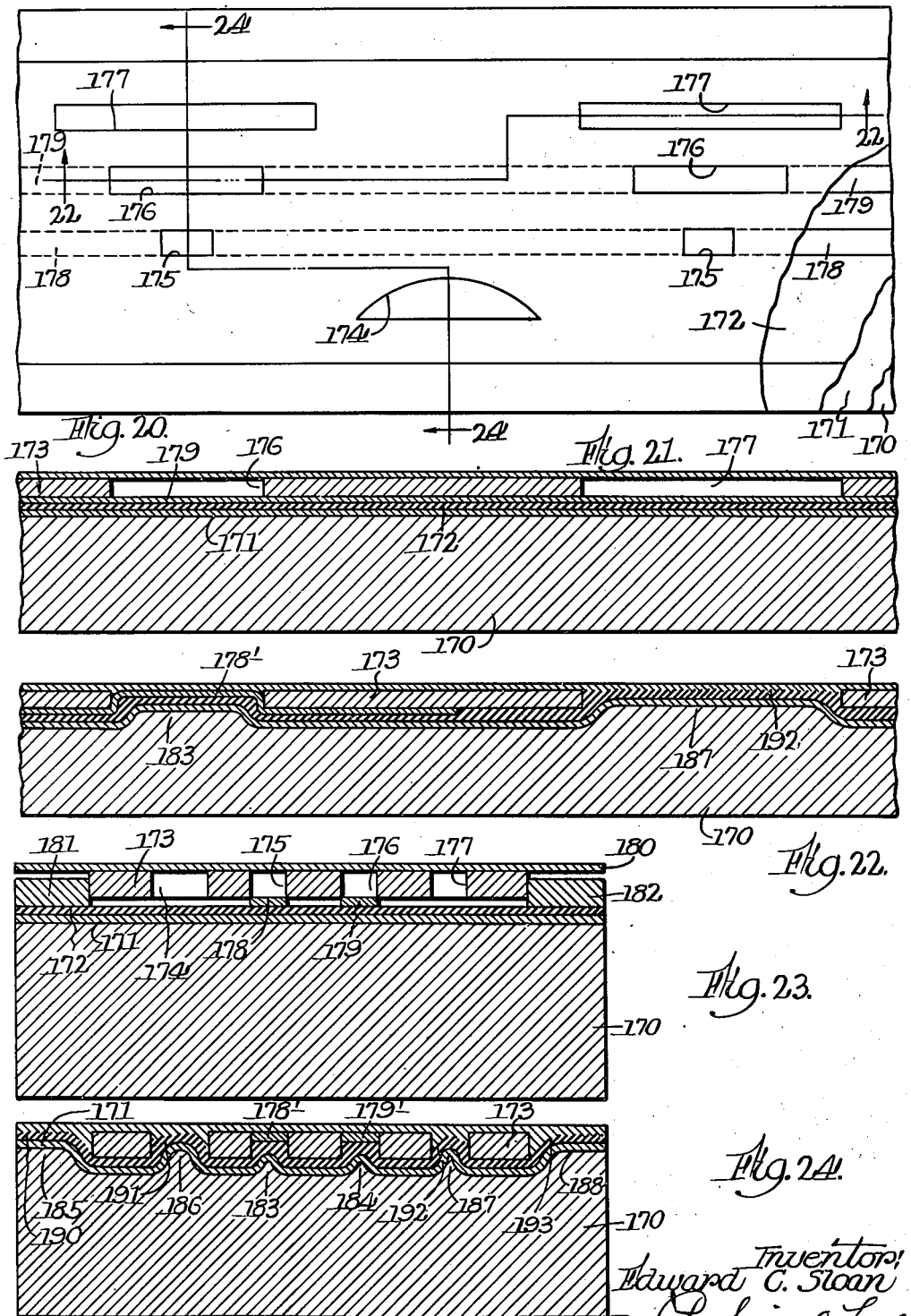

Patented Sept. 10, 1935

2,013,865

UNITED STATES PATENT OFFICE 2,013,865

FIBROUS BODIED ARTICLES AND METHOD OF PRODUCING THE SAME

Edward C. Sloan, Geneva, Ill., assignor to Jesse B. Hawley, Geneva, Ill.

Application May 19, 1934, Serial No. 726,610

19 Claims. (Cl. 18—59)

The present invention relates to the producing of articles the bodies of which are of fibrous material and are so provided with a thermoplastic substance of a resinous base as to present in the produced articles given and predetermined physical properties and characteristics with or without decorative or artistic effects, and among the objects of the invention is to provide novel articles of the character mentioned above and a novel process of producing the same.

The method or process of this invention generally comprises providing the article body with a thermoplastic substances having the characteristics and properties later more fully described, with or without decorative or ornamental means or media, and subjecting the aggregate to heat and pressure to effect the finished article.

The thermoplastic substance referred to is in the class of synthetic resinous compounds known as the vinyl resins of the polymerization group and more particularly those which are permanently thermoplastic, characterized by the bond group or radical —CH:CH$_2$, and which are insoluble in most all known solvents, particularly the hydrocarbon solvents, except the solvents of the ester type or the higher ketones, such as hexone and butyrone. In other words, the substance used in this invention is chemically inert to the extent indicated above and hence is impervious to and proof against moisture, water, acids, alkalies, alcohols, oils, greases, fats, and the like. In its normally pure state it is odorless, tasteless, colorless, and transparent. It is also non-inflammable. It may be given any color or made translucent or opaque as desired by the incorporating or mixing therewith of dyes, pigments, fillers, or the like. It is also tough, durable and resilient. It also has a very strong bonding or adhesive property. If a pliant characteristic be desired, a plasticizer may be added to it to the extent of the pliability required. It may be applied either in liquid or solid form or both. In the solid or non-liquid state it may be in any desired form, such as sheets, films, strips, bars, rods and the like. When using this substance in liquid form, acetone preferably is used as the solvent but it is to be understood other solvents as mentioned above may be used without affecting the idea of invention herein disclosed.

The body of the article produced is preferably of fibrous material, such as pulp or the like. In one form, the body is made in any desired and given shape or form by the accretion and integration of suspended fibres, such as pulp fibres in a pulp bath, in the form of a stratum of any desired thickness upon the surface of a contoured porous former or molding die by the action of suction within the die or pressure on the bath, so as to cause the liquid of the bath to pass through the pores or perforations of the die and leave an accreted and integrated layer or stratum of the fibrous material on the contoured surface of the molding die. The stratum or blank may then be dried and later treated with the substance above mentioned in a manner later described.

Another form of body may be made by the assembly of sheet material, such as cardboard, pasteboard, fibre sheets, fibre boards, or the like, into the desired shape, and then providing the assembly with the thermoplastic substance mentioned above, preferably with decorative means, such as wood veneer, fabric sheets with or without designs, lace, pictures on sheet material whether of paper or otherwise, metal foil in any configuration, paper with or without designs or decoration, overlays, inlays, cameo and intaglio effects, etc., the thermoplastic substance mentioned acting as a strong bond or adhesive to unite and join the parts together and as a covering or surfacing means as more fully later described.

In still another form the body is made by the developing and joining or the developing, bending and joining of fibrous sheets, such as fibre board, binder's board and the like, into the desired shape, such as a cabinet, box and the like, and the applying thereto and uniting therewith of the thermoplastic substance mentioned with or without but preferably with decorative means, such as wood veneer decorative sheets, dyed or pigmented coverings of the thermoplastic substance mentioned, with or without other decorative means, such as wood veneer, design sheets and the like, the coverings and decorative means joining at or being bent over the corners to provide for smooth continuity from a surface to another in different planes.

Another object of the invention is to provide a novel method of producing inlays or the like and a novel article having such inlays and similar decorative features.

A further form of body may be made by the shaping, as by pressure or otherwise, of a piece or sheet of fibrous material, such as manila sheet or paper, cardboard, pasteboard, fibre boards, and the like, and covering or surfacing the shaped body with the thermoplastic substance mentioned to form any desired effect with or without coloring, decoration and the like as above stated.

Another article may be in the form of a sheet carrying or bearing a record, such as a print, picture, etc. and so provided with the thermoplastic substance mentioned above as to protect and preserve the same permanently and indefinitely.

Other objects, capabilities, advantages and the like, are comprehended by the invention as will later appear and as are inherently possessed by the invention.

Referring to the drawings:

Fig. 1 is a view in elevation with parts shown in fragmentary section illustrating an accreted and integrated fibrous body provided with the thermoplastic substance mentioned above and also with an example decoration;

Fig. 2 is a fragmentary sectional view on an enlarged scale of part of the article shown in Fig. 1;

Fig. 3 is a view partly in elevation and partly in section of another article having a body of accreted and integrated fibres treated with the thermoplastic substance mentioned, either in transparent or colored condition and with a pressed in inlay;

Fig. 4 is a view partly in elevation and partly in section showing how two articles may be united rigidly together;

Fig. 5 is a top plan view partly in horizontal section of an article, such as a box or cabinet, embodying the invention;

Fig. 6 is a fragmentary sectional view through a part of the cover and the body of the article shown in Fig. 5 or 8 as the case may be;

Fig. 7 is a fragmentary sectional view of a wall of the article shown in Figs. 5, 6 or 8, showing the inlaying of a decorative inlay, veneer or the like;

Fig. 8 is a part sectional and part plan view of another article, such as a cylindrical box made in accordance with the invention;

Fig. 9 is a sectional view of a fibrous sheet before shaping to form a flanged article, as a cover shown in Fig. 10;

Fig. 10 is a view in elevation of a pressed and shaped cover showing the folds or laps of the edge or flange;

Fig. 11 is a part sectional view of the cover shown in Fig. 10 with coatings, veneer or decoration, and the like;

Fig. 12 is a top plan view of an article, such as a cover, or a plate, or the like having bosses, or cameo impressions, or intaglio;

Fig. 13 is a fragmentary section taken in a plane represented by line 13—13 in Fig. 12;

Fig. 14 is a section similar to Fig. 13 but showing design bosses or relief;

Fig. 15 is a fragmentary section, enlarged, showing the idea of preserving an article bearing a record, such as a print, picture, photograph, painting, engraving, etching, relief, map, drawing, etc.;

Fig. 16 is a fragmentary top plan view with parts in broken section, on an enlarged scale, of an article, such as a cabinet, with jointed corners and united coverings of veneer and the thermoplastic substance mentioned;

Fig. 17 is a fragmentary perspective view with parts shown in broken section of a part of the article shown in Fig. 16;

Fig. 18 is a view similar to Fig. 16 and showing an article with a joint of continuity of the body and decorative sheets at the corners;

Fig. 19 is a plan view of a developed sheet used to produce the body of the article shown in Fig. 18;

Fig. 20 is a face view of part of an article wall showing decoration with inlays effected in a novel manner;

Fig. 21 is a section taken in planes represented by line 22—22 in Fig. 20 before the elements are compressed;

Fig. 22 is a similar view after the elements have been compressed;

Fig. 23 is a view similar to Fig. 21 but taken in a transverse plane represented by line 24—24 in Fig. 20 of the drawings, showing the elements before compression; and, Fig. 24 is a similar view showing the elements after compression.

Referring more in detail to the drawings, the invention is illustrated in several forms of articles constructed in accordance therewith. In Figs. 1, 2, 3 and 4, the article body is of molded or of accreted and integrated fibrous material covered with the thermoplastic substance mentioned above, and if desired with any decorative element, such as wood veneer, fabric pieces with designs, lace, pictures on sheet material whether paper or otherwise, metal sheets or foil in any configuration, designs or pictures drawn, printed or painted on the surface of the article body, imprints, impressions for cameo or intaglio effects, engravings, etchings, and the like. The thermoplastic substance not only acts to coat and penetrate the fibrous body but also acts as a bond or adhesive, a preserver, a reinforcer, a protector, etc.

In Fig. 1 is shown an illustrative article in the form of a receptacle or container. It is made of molded or accreted and integrated fibrous material by the deposition and accreting and integration of the fibres, such as pulp fibres, from a bath of fibres held in suspension in the fluid of the bath, upon a porous former or mold, the fluid of the bath passing through the pores or apertures of the mold under the force of pressure acting on the bath or as suction within the mold or former, and leaving an accreted and integrated stratum or layer of fibrous material on the contoured surface of the mold. The blank thus made may then be removed and dried in any suitable manner, and then operated upon in accordance with the present invention.

The article chosen to illustrate the invention is shown with a fibrous body 1 having a rim portion 2 a part of which is preferably turned in to form a flange 3 so as to leave a smooth rounded brim or edge 4. The inner and outer faces of the body are coated or covered with the thermoplastic substance, thus offering an inner layer 5 and an outer layer 6, as also a layer 7 between the flange 3 and the rim portion 2 to act as a bond or adhesive therefor. If desired a decorative or like element 8 which may be coated or covered on both sides with the thermoplastic substance and applied to the coated or covered surface of the body, or simply applied to the coated and covered surface of the body and coated or covered on the outside surface to form a coating or layer 6' integral with the remainder of the coating or layer 6 on the outer surface of the body.

The thermoplastic substance referred to may be used in sheet form by simply applying the sheet to the surface to be coated or covered, or it may be used in liquid form. The liquid form thereof may be applied by dipping the body of the article in the solution, or by spraying the liquid on the surface, or by applying it with a brush. As the volatile solvent evaporates the liquid thickens and even becomes tacky. Air drying may be used but if desired the coating may be dried more quickly in heated air or the like. When the spraying method is used, it is preferable to use some of the higher volatiles mentioned above so that the evaporating of the volatile solvent may be slower. It is preferable to air dry first to obtain a removal of the major portion of the volatile solvents, and then force dry, in heated air or the like, to remove the residual volatiles. The complete evaporation of the volatiles is to avoid the formation of bubbles or the like, so that when heat and pressure are later applied there will be no bubbles or the like to be trapped and thus form blemishes, defects, flaws or the like, in the covering of the finished article.

The next step is to heat and press the covered body so as to mold the thermoplastic substance. If it be desired to obtain a glossy or lustrous surface for the covering, the molding means, such as dies, have polished surfaces. If a satin finish be desired, the surfaces of the dies are left with a satin like finish. If an embossed or engraved surface be desired, the die surfaces may be contoured or engraved accordingly to effect the desired surface result.

The dies are heated to the necessary temperature to fuse or melt the thermoplastic substance so that it will be sufficiently plastic or fluidal to be easily displaced and to flow to assume an exact counterpart of the surfaces of the dies, under the influence of the heat and pressure of the dies. The pressure effected by the dies also acts to press or compress the layers of the fibrous material, such as the flange 3 and the part 2 whereby the exposed surface of the flange 3 will be substantially flush or even with the inner surface of the container or article.

The fused thermoplastic substance will enter or penetrate into the interstices of the fibrous material to a greater or lesser extent depending upon the amount of thermoplastic substance used, and if desired the fibrous material may be entirely impregnated or permeated with the thermoplastic substance but in most cases it is only necessary to impregnate the surface portion of the article body.

After the necessary heat and pressure have been applied, the casting, that is the article and the die molded thermoplastic substance united thereto, is allowed to cool while being maintained under pressure in the dies, the latter also being cooled. The dies may then be removed. The finished article has a glossy or lustrous coating or a surface in exact counterpart with the surface of the dies. This coating acts as a stiffener or reinforcer for the body portion of the article; also as a strong adhesive or bond for maintaining the parts together in the relations assumed when subjected to pressure and heat; also as a protecting and preserving means preventing the access of moisture and other deteriorating media, etc. to the material of the article, and also as an adorning or embellishing means to give the article an appearance of elegance, and the like. When a decorative element is used, the pressure of the dies will press it into the material of the body portion of the article so that the surface of the decorative element will be substantially even or flush with the surface of the body. A portion of the coating or covering will enter the interstices of the material of the body, and of the decorative element, if any be used, or may wholly impregnate or permeate the material of the body and the decorative element, so that when the coating or covering material is cooled, the whole article will be strong, stiff, solid, and practically an integral unit. In this way an article having the appearance and properties of difficultly made and costly substances, such as stone, crockery, ceramic ware, valuable woods, metals, etc., may be made quickly and easily from inexpensive materials, and the article will be lighter in weight and fully as strong. If it be desired to give weight to the article, the fibrous material may be loaded with weight giving material before applying the thermoplastic substance.

In Fig. 2 is shown, on an enlarged scale, the formation of the brim of the article, the flange 3 being pressed into the fibrous portion 2 and with an intermediate layer 7 of the thermoplastic material so united or bonded with the fibres of the parts 3 and 2 as to hold them in the relations shown, the surface of the flange 3 being flush or even with the inner surface of the receptacle.

In Fig. 3 is shown another article more in the form of a tray or a plate or the like. It has a body or core 10 of accreted and integrated fibrous material like that of the article shown in Fig. 1. Both the inner and outer sides of the tray are provided with coverings 11 and 12 which in this case are preferably colored either with a dye or pigment to give the tray the desired color effect. The edge or rim 13 also has a covering portion 14 as shown. If it be desired a decorative element 15 may be pressed at any desired point into the body 10 of the tray and may show through the thin layer or film 16 on the surface of the element 15. After the coverings of the thermoplastic substance, and the decorative element if any be used, are applied, the assembly or aggregate is then hot die pressed and the thermoplastic substance fused and molded in the same way as described above in connection with the article shown in Figs. 1 and 2. After cooling, the dies are removed from the article.

Inasmuch as the thermoplastic substance used in the present invention has a very strong bonding or adhesive property, two or more articles may be united to form a unitary article or cellular unit. As for example, in Fig. 4, are shown cells or receptacles 20 and 21 united by the solidified thermoplastic substance. The cells or receptacles mentioned comprise fibrous bodies 22 and 23 of accreted or integrated fibrous material and have coverings or layers 24, 25, 26 and 27, as shown in Fig. 4, together with coverings or layers applied to the bottoms or adjacent walls 28 and 29 of the cells or receptacles to form a uniting or joining stratum 30 between the receptacles 20 and 21. The thermoplastic substance is applied as in the cases above described, either in liquid or sheet form, and then the properly shaped hot dies are fitted to the aggregate and pressure applied. The heat fuses the thermoplastic substance to produce the desired surface effects as explained above, and to blend the coverings on the bottoms 28 and 29 to produce an integral uniting or joining stratum or lamina. After cooling the dies are removed and the receptacles are rigidly and permanently connected or united together. If desired any decorative means may also be applied in any suitable manner as above described in connection with the forms of articles shown in Figs. 1, 2 and 3.

In Figs. 5, 6, 7 and 8 are shown articles built up from sheet material such as cardboard, pasteboard, fibre sheets, fibre board, or the like, Fig. 5 illustrating a rectangular type or receptacle, box, cabinet or the like; Fig. 8 showing a cylindrical type of receptacle; Fig. 6 showing a form of cover or cap or top means for either the rectangular or the cylindrical form, and Fig. 7 showing a wall part of either with a decorative element. In these forms wood veneer may be and is preferably used for the surface decoration with or without other and different kinds of decorations as illustrated in Fig. 7.

Referring more in detail to Fig. 5, the body of the article is composed of one or more thicknesses of sheet material, as above mentioned, and comprises side and end walls 31, 32 and 33. Each wall may be of a single thickness of fibrous material or made up of two or more sheets united together by the thermoplastic substance mentioned above. The inner and outer faces of this assembly are covered with layers or sheets 34 and 35 of the thermoplastic substance as shown. The edge portions 36 and 37 of the walls 31 and 32 may overlap the edge portions 38 and 39 of the wall 33 and are united thereto by the thermoplastic substance at the joints 40 and 41. If desired reinforcing pieces 42 and 43 may be provided in the corners, these pieces being united to the walls by the thermoplastic substance 34 and being covered with layers 44 and 45 thereof. The reinforcing pieces may be of fibrous material cut and shaped to fit, or may be of any other material, such as wood or the like.

To the outer surface of the coated or covered body are applied sheets 46, 47 and 48 of wood veneer or the like. If desired both sides of the veneer sheets may be coated or covered with the thermoplastic substance before applying the veneer sheets in place on the covering 35. If the thermoplastic substance be applied in liquid form, the coated veneer may be applied in place either before or after the coating on the body has dried. The edges 49 and 50 of the veneer sheets 46 and 47 preferably overlap the edges 51 and 52 of the veneer sheet 48. Then the assembly is provided with a covering 53 of the thermoplastic substance either in liquid or solid sheet form. If in the former, the same is permitted to dry before applying heat and pressure to the assembly.

If desired, when assembling the parts, each part may be coated with the thermoplastic substance and the coating allowed to dry, and then the parts assembled. The adherence and uniting of the parts will then be effected when the thermoplastic substance is fused or made fluidal under heat and pressure, or, instead of coating the parts as stated, sheets of the thermoplastic substance may be placed on the surfaces of the parts and the aggregate then subjected to heat and pressure to fuse the thermoplastic sheets to unite the parts together in a unitary and rigid article.

After the parts are assembled, properly shaped hot dies are applied to the assembly to heat the parts and to subject them to a pressure. The heat and pressure will cause the thermoplastic substance to fuse and become fluidal and conform to the die surface contour, the fused substance also entering into the insterstices of the fibrous wall parts and the veneer sheets to firmly bond them together in a unit. The dies and the assembly are then allowed to cool whereby the thermoplastic substance solidifies or sets so that when the dies are removed, the completed article is a rigid bonded unit with a hard, durable, tough and glossy surface. The article is as rigid and as strong as a similar article made wholly of wood. It will be apparent that this article may be quickly and easily made from inexpensive materials and will have the appearance and embellishments of an article which is difficultly made and which is composed of costly material such as valuable woods.

In Fig. 8 the sheet material is bent or curved into cylindrical form. As shown the body comprises an inner fibrous sheet 54 having abutting edges 55 and 56 united together by a layer 57 of the thermoplastic substance, and covered with inner and outer coatings 58 and 59 of the thermoplastic substance. Surrounding the sheet 54 is another similar sheet 60 having abutting edges 61 and 62 united together by a layer 63 of the thermoplastic substance, and covered with inner and outer coatings 59 and 64 of the thermoplastic substance, the joints 60—62—63 and 55—56—57 being preferably off-set such as diametrically opposite each other.

Around the outer wall sheet and united to it by the thermoplastic layer 64 is a sheet of wood veneer 65 having a coating 66 on its outer surface. If desired any decorative means or element 67 may be applied and covered with a coating 68 which may blend with the remainder of the coating 66 covering the veneer sheet 65.

As stated above, in connection with the article shown in Fig. 5, the parts of the article shown in Fig. 8 may be first coated and united together before the coatings are dry, or the coatings may be permitted to dry separately, or solid sheets of the thermoplastic substance applied in place to cover the parts, and the parts then assembled to be subjected to heat and pressure.

The assembly is then subjected to heat and pressure of properly shaped hot dies to fuse the thermoplastic substance so that it will conform to the contour of the die surfaces and enter into the interstices of the body sheets and the veneer and the decorative means if any be used, so as to form a substantially rigid bonded unit. The article and the dies are then permitted to cool so that the thermoplastic substance may solidify, after which the dies are removed, leaving the finished article with a hard, tough, durable and glossy surface, or such other surface as may have been molded by the contour of the die surfaces. The article is as rigid and strong as and because of the use of wood veneer has the appearance of a similar article made wholly of wood.

Fig. 6 illustrates the making of a cap, cover or the like adapted to fit either the article shown in Fig. 5 or Fig. 8, being rectangular for the article of Fig. 5 and round for the article of Fig. 8. This cover comprises an inner wall sheet or sheets 70 and a top sheet 71 having an inner coating 72 of the thermoplastic substance. The edges 73 and 74 of these sheets preferably overlap and are joined by a layer 75 of the thermoplastic substance. To the outer surface of the sheet 70 is applied a wood veneer sheet 76 with an inner layer 77 and an outer layer 78 of the thermoplastic substance, the layer 77 also serving as an outer layer for the sheet 70. Above the sheet 71 is applied a fibrous sheet 79 having an inner layer 80 and an outer layer 81 of the thermoplastic substance, the layer 80 serving also as an outer layer for the sheet 71. The edge 82 of the sheet 79 is in overlapped abutment with the edge 83 of an outer wall sheet 84 having inner and outer layers or coatings 85 and 86 of the thermoplastic substance, the layer 85 blending with a part of the layer 78, and also forming a joining means 87 between the edges 82 and 83.

Overlying the sheet 79 and the sheet edge 83 is a sheet 88 of wood veneer having inner and outer layers 81 and 89 of the thermoplastic substance, the layer 81 being common to sheets 79 and 88. Surrounding the sheet 84 is a sheet 90 of wood veneer having inner and outer layers 86 and 89 of the thermoplastic substance, the layer 86 being common to the sheets 84 and 90 and also serving as a joining means 92 for the overlapping abutting edges of the veneer sheets 88 and 89. If desired, a decorative or ornamental element may be included in the outer layer 89 or 91 or both, in a manner herein described. The cover has a parting edge 93 with the body of the article. The body of the article comprises an inner sheet 94 having layers 95 and 96 of the thermoplastic substance, an outer sheet 97 having layers 98 and 99 of the thermoplastic substance, and a wood veneer sheet 100 having layers 99 and 101 of the thermoplastic substance, a part of the layer 98 being blended with the layer 96. The inner projecting part of the cover slides with respect to the body of the article, the layer 78 of the cover sliding over the surface of the layer 98 of the body as is clear in Fig. 6.

As in the above cases, the parts of the cover may be coated or covered with the thermoplastic substance and assembled together before the substance dries, or the parts may be separately coated or covered and permitted to dry before assembly of the parts, or the substance in dry solid sheet form may be applied to the parts and then all assembled together, before subjecting the aggregate to heat and pressure. With the parts assembled, the assembly is then subjected to the heat and pressure of properly shaped and contoured hot dies which cause the thermoplastic substance to fuse and become fluidal to conform to the die surfaces and to enter the interstices of the sheets, both the fibrous and veneer sheets, to produce a rigid, strong, and bonded unit. The article and the dies are then permitted to cool while still maintaining the pressure, and after cooling the dies are removed, leaving the finished article which has a hard, durable, tough and glossy or molded surface. The finished article is as rigid and strong as and by reason of using wood veneer, has the appearance of a similar article made wholly of wood.

Fig. 7 illustrates the application of decoration or ornamentation, other than wood veneer, to the articles of Figs. 5, 6 and 8. To the top or side wall or both of such article, a decorative element 102 is united to the surface of the wood veneer sheet 103 with a suitable layer 104 of the thermoplastic substance, the veneer being united to the fibrous sheet 105 by a layer 106, and the sheet 105 being united to the sheet 107 by a layer 108, and the sheet 107 being covered by a layer 109, of the thermoplastic substance. A layer 104' may also cover the decorative element 102 and blend with the remainder of the layer 104 on the veneer surface. When the parts are subjected to heat and pressure, the coatings or coverings 104 and 104' blend together into a single layer, and the decorative element 102 is pressed against or into the surface of the veneer 103 and because of the entry of part of the thermoplastic layers into the interstices of the veneer and the decorative element and the sheets 105 and 107, the parts are united or bonded rigidly together into a practically integral unit.

As before stated, the thermoplastic substance may include any dye or pigment or filler to give the desired color, translucency, opaqueness, and the like to the finished article.

The articles shown in Figs. 9, 10, 11, 12, 13 and 14 are formed or shaped sheets of fibrous material such as manila sheet or paper or the like, cardboard, pasteboard, fibre sheets, fibre board, and the like, which has sufficient compliance to be formed, shaped or strained by suitable means. To illustrate, a sheet 110 (Fig. 9) may be provided with layers or coatings 111, 112 and 113 on both surfaces and at the edge thereof. The sheet may then be placed in a suitable die press or the like to shape it into the form of a cup or cap or the like so that the marginal portion 114 of the sheet will be formed into folds having laps 115 and 116 (Fig. 10) with portions of the layers 111 and 112 of the thermoplastic substance between the laps to unite and bond them together when the article is later subjected to heat and pressure. As shown in Figs. 10 and 11 the cup or cap has a series of overlaps 115 and underlaps 116 with intervening layers 117 of the thermoplastic substance, a part being shown broken away in Fig. 10 to show the lapping feature and the layer 117 on an underlap. In the finished article, the parts 115 and 116 are so compressed as to be of the same thickness as the remainder of the body of the article. If the formed article or blank be not coated or provided with a layer of thermoplastic substance before shaping the normally flat sheet, the coatings or layers 111, 112, 113 and 117 may be applied afterwards in any of the ways described above. The outer layer, if desired, may include any color producing substance or matter such as a dye, pigment or filler to give the color effect desired.

If a decorative effect is desired, the decorative means may be applied to the surface of the layer 111, and it may be wood veneer, or a textile sheet with design, or lace, or paper with design, or a picture or the like. Such a decorative piece 118 is shown in section in Fig. 11. Over the flange part of the body, this decorative piece may have folds having laps 119 and 120 with an intervening layer 121 of the thermoplastic substance. Over the outer surface may be a covering or layer 122 of the thermoplastic substance. If wood veneer be used, the marginal portion may be slitted so as to provide tongues which may overlap or abut on the flange, and which may be so compressed, when the article is subjected to the heat and pressure of the hot dies, as to appear to be of a single thickness and a single sheet. If desired a design piece 123 (Fig. 12) may be included in the outer layer 122.

The assembly is subjected, as in the cases above described, to heat and pressure, by the application of properly shaped hot dies to the assembly. The heat and pressure causes the thermoplastic substance to fuse and become fluidal to conform to the surfaces of the dies and to enter into the interstices of the body piece and the decorative element to form a practically integral rigid unit.

If the die surfaces are provided with depressions or the like, the thermoplastic substance will fill them and when the article and dies are cooled and the die removed, the article will have bosses or cameo elements 124, these elements being an integral part of the layer 122 as shown in Fig. 13. These elements may be of any shape desired, such as lines, ribs, etc. If some coloring substance or matter or some of the pigmented thermoplastic substance be first placed in the depressions in the die surface, the thermoplastic substance covering the article will unite therewith and the molded elements 124 will be colored according to the dye or pigment used. If intaglio effects should be desired the surface of the die may have raised portions so that intaglio impressions will be molded in the surface layer 122.

Bosses or cameo elements may also be produced by the displacement of part of the material of the articles such as is shown in Fig. 14, in which case the die surface is provided with bosses or similar projections which, when the dies are pressed against the assembly, form displaced portions 121 of all strata of the article including the inner, intervening and outer layers 112, 111, and 118, of the thermoplastic substance and the body layer 110 and the veneer or decorative sheet 118 to form corresponding contoured portions 112', 111', 122', 110' and 118' as shown in Fig. 14.

The heat and pressure of the dies cause the thermoplastic substance to fuse and become fluidal to conform to the contour of the die surfaces, the pressure acting also to shape the assembly by compression or displacement or both of the parts, and the thermoplastic substance enters the interstices of the strata or sheets 110 and 118 to form, on cooling, a practically integral rigid unit.

In Fig. 15 is shown a section of a record bearing articles, such as a document, writing, print, typed or printed matter, newspaper, picture, photograph, map, chart, engraving, etching, relief, painting, or any other like and similar article treated in accordance with the invention to permanently and indefinitely preserve and protect such articles. The term record is used generically to include all of the articles mentioned above, and intended to be covered by this invention. It comprises a body 125 usually in sheet form and usually of fibrous material such as paper or the like. On its surface is some record 126, such as printed matter, a painting, a lithograph, an engraving, a photograph, a drawing, and other like and similar records, the material of which has partly entered the interstices of the body 125 and in some cases partly projects over the surface of the body 125. The surfaces of the record 126 as also of the body 125 are covered with layers or sheets 127 and 128 of the thermoplastic substance. The next step is to heat and press the covered body so as to mold the thermoplastic substance. Ordinarily it will be desired to have a glossy or lustrous surface for the coating of the article and to effect this, the dies will have polished surfaces. In the cases of etchings, engravings and the like, where it is desired to retain the original characteristics thereof, the covering will not have a glossy or lustrous surface but will have a surface so roughened or formed as to be non-reflective of light and imperceptible whereby the etching, engraving or the like will be visible through the covering with its natural effect. To accomplish this the molding surface of the dies may have a specially fine mat or a sand blast finish whereby the surface of the covering will show no gloss or luster. When the assembly is then subjected to heat and pressure by the application of the hot dies, usually in the form of plates, the thermoplastic substance is caused to fuse and to become fluidal so as to conform to the surfaces of the dies and to enter the interstices of the body 125. After the dies and the article have cooled the dies are removed. The article with its record is thus embedded or enveloped in the thermoplastic substance whereby the whole becomes practically an integral unit. In this way the record carried by the body 125 as also the body itself are permanently and indefinitely preserved and protected against aging, deterioration, discoloration, atmospheric conditions, vapors, smoke, chemicals, and the like. In many cases it may be desired that the article be more or less flexible or pliant. Accordingly, the thermoplastic substance may be mixed with a suitable plasticizer so as to give the desired amount of pliability to the finished article.

The articles shown in Figs. 16, 17, 18 and 19 are made up from fibrous sheets, such as fibre board, binder's board and the like, covered with decorative sheets, such as wood veneer, design sheets, dyed or pigmented sheets of the thermoplastic substance mentioned, with or without further design means or elements united to the surface of the article. As shown these articles may be boxes, cabinets such as radio, speaker, music, and similar cabinets, and the like. In the case of a radio cabinet, the latter is usually open at the back for ready access into the cabinet. Such a cabinet consists of a front wall or panel, end walls, a top wall and a bottom wall. It is preferable that the walls be connected together at their meeting edges by some joining means, matched or continuous, to give the cabinet rigidity and strength.

Each of the sheets of the cabinet shown in Figs. 16 and 17, is covered on the side to be the outside when forming a wall of the cabinet, with a layer or sheet of the thermoplastic substance mentioned. If the substance is applied in liquid form it is allowed to dry until all the volatile solvent has evaporated. It will penetrate into the interstices of the fibrous sheet to become united therewith. If a sheet of the thermoplastic substance be placed on the fibrous sheet it may be held in place by a few touches of the liquid substance or by applying heat at a few spots.

The sheets are then die cut to proper size and to provide joining means, such as the tongue and groove type of joint, at those edges of the sheet to be joined to other sheets in the final assembly. To the edges of the tongues and grooves are applied some of the thermoplastic substance to act as a bond therefor when the wall sheets are joined as later explained. The sheets are then joined together by matching the tongues and grooves to form the cabinet body or the like. The outer surface of the cabinet is then covered with decorative sheets, such as wood veneer or other decorative sheets as desired, together with one or more layers or sheets of the thermoplastic substance. The decorative sheets may each be of the same size as the face covered by it and have its edges meet the edges of the sheets on the adjoining faces at the corner of the adjoining faces, or if desired the decorative sheet, such as the wood veneer, may be large enough to cover two or more faces of the cabinet and may be bent over the corner or corners so as to provide a continuity of the sheet around the corner. When the assembly is subjected to heat and pressure, the thermoplastic substance fuses and penetrates the interstices of the fibrous and decorative sheets as also of the tongues and grooves of the adjoined sheets, to become united thereto and to unite them firmly together to produce a rigid unitary article fully as strong as if the article were made wholly of wood or the like.

Referring more in detail to Figs. 16 and 17, the article is shown as comprising a wall 131, such as a top wall, and walls 132 and 133 which may be side and end walls, of a cabinet. The top wall 131 is joined to the side or end wall 133 by tongues 134 matching with tongues 135 and the bonding thermoplastic substance 136 between the matched tongues. Likewise the side and end walls 132 and 133 are joined by matching the tongues 137 and 138 of the walls 133 and 132 respectively, and the bonding thermoplastic substance 139 between the matched tongues.

The outer surfaces of the walls are covered with a covering 140 of the thermoplastic substance, the same being integral with the bonding substance 136 and 139, and being firmly united to the surface portions of the walls by penetrating into the interstices of the fibrous material. Covering the wall faces and being united to the covering 140, are decorative sheets 141 and 142, such as wood veneer or the like, the sheets 141 and 142 abutting at the corner of the adjoining walls. If desired the decorative sheet may be in one piece and bent over the corner of the adjoining walls. In either event the decorative means is covered with a covering 143 of the thermoplastic substance which is firmly united to the decorative means and provides a covering for the whole article.

In the process of producing this article, the walls, after they have been covered with the thermoplastic substance, and die cut, are joined by matching the tongues and grooves; then this assembly is covered with the thermoplastic substance, preferably in sheet form; then covered with the decorative sheet or sheets, and then covered with the thermoplastic substance 143 also preferably in sheet form. The whole assembly is then subjected to heat and pressure of properly shaped and heated dies which cause the thermoplastic substance to fuse and penetrate the interstices of the fibrous sheets and the decorative sheets and to blend with the substance between the matched tongues so that on solidifying the substance forms a firm bond to maintain the parts together in a rigid unit. The surfaces of the dies are preferably smooth so as to mold a glossy or lustrous surface on the covering 143. The next step is to cool the assembly and the dies while still maintaining the pressure, so that the thermoplastic substance will solidify and bond the parts into a rigid unit. After cooling the pressure is removed by removing the dies. This leaves a finished article as above described, having the appearance and also the strength of a similar article made wholly of wood, and having a tough, durable and lustrous surface.

If desired any other decorative element 144 may be imbedded in the covering 143 and united to the veneer 142 by the thermoplastic substance.

Also, instead of providing a veneer over the entire surface of the article, if desired, the covering 140 of the thermoplastic substance may be dyed or pigmented with any desired or given color effect, and the veneer 141—142 omitted. The colored covering may be the covering for the whole article, or a transparent covering 143, may be used as the covering for the whole article. Decorative elements may be inlaid in the colored covering and covered by a transparent covering 143.

Referring to Figs. 18 and 19, the article, such as a cabinet as above mentioned, may be made from a single sheet of fibrous material, such as binder's board or the like, by bending at given loci to form certain corners, and joining certain edges to form other corners. The sheet shown in Fig. 19, (on a reduced scale) may be one or more thickness of binder's board united together with the thermoplastic substance mentioned. A face of the sheet is covered by a layer or sheet 150 of the thermoplastic substance. The sheet is die cut to proper size and to provide the wall portions 151, (front wall) 152 and 153 (end walls), 154 (top wall), and 155 (bottom wall), and joint tongues and grooves at certain edges. Scorings, or the like, 156 and 157 are provided at the junctures between the wall portion 151 and the other wall portions to facilitate the bending of the sheet to form corners. A suitable amount of the thermoplastic substance may be applied to the edges of the tongues and grooves to act as a bonding agent when the assembly is later subjected to heat and pressure.

The sheet is bent at the scorings to form corners, a corner between the front and top walls 155 and 154 being shown in section in Fig. 18. The covering 150 may be covered with a decorative sheet, such as wood veneer, design sheet, metal foil of any configuration, etc., as desired. In the form shown in Fig. 18, it is covered with a sheet 158 of pigmented thermoplastic substance which later blends with the covering 150 when heat and pressure are applied. A decorative element 159, such as wood veneer, or design sheet, and the like may then be applied in the colored covering 158, later becoming inlaid in such covering, as shown in Fig. 18. Then the outer surface of the assembly has a covering 160 of preferably transparent thermoplastic substance.

Such an assembly is subjected to heat and pressure by the application of properly formed and heated dies having given surface contours to mold the surface of the covering 160. The heat and pressure causes the thermoplastic material to fuse and to enter the interstices of the fibrous sheets and the decorative sheet to unite therewith and to unite them together in a rigid unit, and also to unite and blend with the pigmented covering, and to unite and blend with the thermoplastic substance between the tongues of the joints to firmly bind them together. The decorative element 159 which may be wood veneer or contoured metal foil, or any other type of decorative means, is preferably bent and located to cover the corner, so that there is a continuity of the sheet 159, and the pressure of the dies forces the sheet 159 into the pigmented covering 158 to become an inlay therein, the surfaces of the sheets 158 and 159 being flush or even. The corner portion of the fibrous sheet portion 154—155 is a continuous or integral joint by the bending of the sheet at the scored locus. This provides for a strong joint or corner with no danger of parting thereat. By bending the decorative element 159 around the corner, the continuity of the joint is maintained and the corner is strengthened or reinforced.

If desired, the wood veneer may cover the whole surface of the article, in which case a pigmented covering 158 will not be necessary. The veneer sheet may be cut to the shape and size of the sheet shown in Fig. 19 but without the tongue and groove feature, the edges of the end wall portions of the veneer sheet meeting in abutting lines with the end edges of the top and bottom wall portions at the jointed corners of the sheet portions 152 and 153 with the sheet portions 155 and 154. The covering 160, when solidified firmly unites these veneer edges together and to the covering 150. At the corners between the wall portion 151 and the portions 154, 155, 152 and 153, the veneer will be bent and continuous or integral.

Because of the creasing or scoring of the sheet at 156 and 157 and the bending of the sheet to form the corner joint, the material is so upset as to produce ribs 161, 162 and 163 with intermediate grooves 164 and 165. It is preferable to unite thereto some of the thermoplastic substance 166 which when fused and then solidified will strengthen or reinforce the joint or bend.

In Figs. 20 to 24 inclusive is shown an article wall portion with inlays or the like effected in a novel way. The body is preferably made from sheets of fibre board or the like. The portion shown comprises such a sheet 170 upon a surface of which is a covering 171 of the thermoplastic substance which after being subjected to heat and pressure, enters or penetrates into the interstices of the surface portion of the sheet. Upon the covering 171 is a decorative layer or covering 172 which also may be of the thermoplastic substance with coloring matter, such as a dye, pigment or filler or the like, or may be a decorated sheet such as decorated silk impregnated with the thermoplastic substance the latter being preferably transparent with or without color, or the like. On the covering 172 is a decorative sheet 173 which preferably is wood veneer which may or may not be covered or coated with the thermoplastic substance as desired. The veneer sheet has die cut apertures 174, 175, 176 and 177 in which the inlays are eventually located after heat and pressure have been applied to the assembly. Before the veneer sheet is located in place, inlay strips or ribbons, or the like of any given or desired color, texture, design, simulation, etc., such as strips 178 and 179, are so placed or located on the covering 172 as to be opposite or in registry with the apertures, such as the apertures 175 and 176, of the veneer sheet 173 when the latter is placed over the covering 172 as above explained. Such strips may also be placed to register with the apertures 174 and 177, but for the purpose of illustrating the inlaying with colored thermoplastic substance, the strips may be omitted under certain apertures, such as apertures 174 and 177 whereby when the assembly is later subjected to heat and pressure portions of the colored thermoplastic covering 172 will form the inlays in said apertures. Over the veneer is a covering 180 of transparent thermoplastic substance. Figs. 21 and 23 show in section the relationship of the elements before the assembly or aggregate is subjected to heat and pressure and Figs. 22 and 24 are similar views showing the same after the application of pressure and heat.

The thermoplastic substance may be applied either in liquid or sheet form, but preferably in the latter, wherein the sheet 171 is first placed on the surface of the sheet 170; then sheet 172 is placed on sheet 171, then strips 178 and 179 are located on sheet 172; then veneer 173 is placed over sheet 172 and supported upon strips 178 and 179, and then sheet 180 is placed on the veneer to extend over it and beyond it and over the sheet 172. The veneer sheet may be previously covered or coated with the thermoplastic substance, but if not, then a sheet of the thermoplastic substance will be applied to each face of the veneer. If the space between the sheets 172 and 180 beyond the edges of the veneer should require it, strips, such as strips 181 and 182, may be used to avoid any shortage or insufficiency of the thermoplastic substance when fused and molded by the heat and pressure applied to the assembly.

The assembly or aggregate is then subjected to heat and pressure. This is effected by the application of properly shaped heated dies. The heat of and the pressure by the dies cause the thermoplastic substance to fuse and become fluidal so that it flows and is molded to conform to the conforming faces of the dies. In this case the die faces are preferably polished so that the surface of the covering 180 will be left glossy or lustrous. The fused thermoplastic substance will enter or penetrate into the interstices of the fibrous sheet 170, the veneer 173, the inlays 178 and 179, and a decorative sheet (172) if one be used in lieu of a colored layer 172 of the thermoplastic material.

Upon applying pressure, the parts are compressed so that portions 183, 184, 185, 186, 187 and 188 of the fibrous sheet 170 will be displaced and will press into the spaces at each side of the veneer sheet and the apertures thereof as shown in Figs. 22 and 24. The thermoplastic substance of the layers 171, 172, 181 and 182 likewise will be displaced besides uniting and blending together, as also uniting and blending with the layer 180, to form inlay portions 190, 191, 192 and 193. See Fig. 24. In this way the united and blended displaced portions thereof fill the apertures 174 and 177 as also the spaces at the sides of the veneer sheet thus providing for molded-in inlays in said apertures, the inlays showing the color or decorative effect possessed by the layer or sheet 172 in said apertures and at the sides of the veneer sheet.

Similarly, the portions 178' and 179' of the strips 178 and 179 opposite the apertures 175 and 176 in the veneer sheet, will be displaced and be located in and substantially fill the apertures 175 and 176, these portions 178' and 179' being otherwise imbedded in the thermoplastic substance blending with the surface covering 180. See Figs. 22 and 24. Since the covering 180 is transparent, the color or decoration of the inlays 178' and 179' and the thermoplastic substance 172 or decorative sheet imbedded therein if one be used, and the graining of veneer sheet 173, are all clearly visible. The effect produced is, in this example, a veneer with colored or decorated inlays. The surface of the covering 180 being glossy or lustrous, gives the article a beautiful and elegant appearance.

After the compressing and molding are completed, the article and dies are cooled while maintaining the pressure, and then the dies are removed. On cooling the molded thermoplastic substance solidifies so that the article is practically an integral unit.

Thus is provided a simple and novel method of inlaying by merely displacing the inlay material in the inlay apertures and so uniting the thermoplastic substance thereto as to maintain the inlays in place. The painstaking care previously required to accurately cut the inlay pieces to exact shape and size of the inlay recess, is, by the present invention, wholly avoided or eliminated.

When convenient instead of deriving all of the heat from the dies to produce the desired effect, the assembly of the parts may be separately heated in any suitable manner, not sufficient to cause the thermoplastic substance to prematurely fuse or become plastic before the dies are applied. In such case the dies will not need to be heated as much as when all of the heat necessary for the desired effect must be supplied wholly from the dies. The added heat when the dies are applied, will be sufficient to render the thermoplastic substance fluidal and become molded as described above. In that way a more thorough and a quicker thermoplastic action is effected, and the time of cooling is decreased. Less heat is necessary in the dies and hence the dies cool more quickly.

While I have disclosed a few embodiments of the invention and a mode of producing them, it is to be understood that the invention is not limited thereto but comprehends other constructions, details, arrangements of parts, features and process steps without departing from the spirit of the invention.

Having thus disclosed the invention,

I claim:

1. A method of making an article having a body of fibrous material, comprising covering the surface of said body with a layer of a thermoplastic vinyl resin of the bond group—$CH:CH_2$, applying heat to cause the thermoplastic substance to fuse with said body and form a covering for said body, and cooling the same to cause the thermoplastic substance to solidify.

2. A method of making an article having a body of fibrous material, comprising covering the surface of said body with a layer of a plastic vinyl resin of the bond group—$CH:CH_2$, applying heat and pressure to cause the thermoplastic substance to fuse with said body and form a covering for said body, cooling the same while under pressure to cause the thermoplastic substance to solidify, and removing the pressure.

3. A method of making articles having a body of fibrous material, comprising covering said body with a layer of a thermoplastic vinyl resin of the bond group—$CH:CH_2$ in the presence of heat and pressure to cause the body and the substance to fuse together, cooling the same to produce a strong unit, and removing the pressure.

4. A method of surfacing an article having a body of fibrous material, comprising applying a thermoplastic vinyl resin of the polymerization group to the surface of said body, hot die pressing said substance and article to fuse them together and to shape the same to conform to the surface of the die, cooling the same to solidify the substance on the surface of said body, and removing the die pressure to leave the body with a covering having a given surface produced by the die surface.

5. A method of producing an article having a body of fibrous material, comprising applying a decorative means to said body, applying a layer of a thermoplastic vinyl resin of the bond group—$CH:CH_2$ to said body and said decorative means, applying heat and pressure to said body, means and substance to cause them to fuse together, cooling the same to effect a unitary article, and removing the pressure to leave a decorated article.

6. A method of producing a decorated article having a body of fibrous material, comprising applying a thermoplastic vinyl resin of the polymerization group to the surface of said body and a decorative element, applying heat and pressure thereto to press the decorative element in the surface of the body and to cause the substance to fuse for uniting said body and said element and to unite with said body and said element, cooling the same while under pressure to effect a rigid unit thereof, and removing the pressure.

7. An article consisting of a body of fibrous material and a covering of thermoplastic vinyl resin of the bond group—$CH:CH_2$.

8. An article consisting of a body of fibrous material, and a covering of a thermoplastic vinyl resin of the polymerization group fused to said body.

9. An article comprising a body of fibrous material, a decorative element at the surface of said body, and a covering of a thermoplastic vinyl resin of the bond group—$CH:CH_2$ fused thereto and fusing said body and element.

10. An article comprising a body of fibrous material and a covering of a thermoplastic vinyl resin of the bond group—$CH:CH_2$ fused to the surface portion of said body and having a surface of given character.

11. An article comprising a body of fibrous material, a decorative element fused to a surface portion of said body by a thermoplastic vinyl resin of the bond group—$CH:CH_2$ and a covering of said substance fused to said body and element.

12. An article comprising a body of fibrous material, a covering of a thermoplastic vinyl resin of the polymerization group fused to the surface portion of said body, and a color giving matter included in said substance to give the desired color to the article.

13. An article comprising a plurality of bodies of fibrous material, and a covering of a thermoplastic vinyl resin of the bond group—$CH:CH_2$ fused to the surface portions of said bodies and uniting said bodies into a rigid unit.

14. An article comprising a plurality of bodies of fibrous material and having adjacently related surface portions, and a covering of a thermoplastic vinyl resin of the bond group—$CH:CH_2$ fused to the surface portions of said bodies and said adjacently related surface portions for fusing said bodies into a rigid unit.

15. An article comprising a body of accreted and integrated fibrous material, and a covering of a thermoplastic vinyl resin of the bond group—$CH:CH_2$ fused to the surface portion of said body and having a given surface finish.

16. An article comprising a body of accreted and integrated fibrous material, a decorative means at the surface of said body, and a covering of a thermoplastic vinyl resin of the polymerization group fused to the surface portion of said body and said means and having a given surface finish.

17. An article comprising a body of fibrous material inclosed in a solid covering of a thermoplastic vinyl resin of the bond group—$CH:CH_2$.

18. An article comprising a core of fibrous material, and a casting of thermoplastic vinyl resin of the bond group—$CH:CH_2$ inclosing said core.

19. An article comprising a hollow casting of solidified thermoplastic vinyl resin of the polymerization group and a core of fibrous material inclosed therein.

EDWARD C. SLOAN.